(12) United States Patent
Nishitani

(10) Patent No.: US 10,425,020 B2
(45) Date of Patent: Sep. 24, 2019

(54) VIBRATION WAVE MOTOR, LINEAR DRIVING APPARATUS USING VIBRATION WAVE MOTOR, AND OPTICAL APPARATUS

(71) Applicant: CANON KABUSHIKI KAISHA, Tokyo (JP)

(72) Inventor: Hitoshi Nishitani, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 466 days.

(21) Appl. No.: 15/348,190

(22) Filed: Nov. 10, 2016

(65) Prior Publication Data
US 2017/0149359 A1    May 25, 2017

(30) Foreign Application Priority Data

Nov. 20, 2015    (JP) .................................. 2015-227408

(51) Int. Cl.
| | | |
|---|---|---|
| H01L 41/09 | (2006.01) | |
| H02N 2/06 | (2006.01) | |
| B06B 1/06 | (2006.01) | |
| G02B 7/02 | (2006.01) | |
| G02B 7/08 | (2006.01) | |

(52) U.S. Cl.
CPC ............. *H02N 2/06* (2013.01); *B06B 1/0644* (2013.01); *B06B 1/0648* (2013.01); *G02B 7/023* (2013.01); *G02B 7/08* (2013.01)

(58) Field of Classification Search
CPC ...... H02N 2/06; B06B 1/0644; B06B 1/0648; G02B 7/023; G02B 7/08
USPC ....................... 310/323.01–323.19, 321, 328
See application file for complete search history.

(56) References Cited

U.S. PATENT DOCUMENTS

| 4,672,256 A | * | 6/1987 | Okuno | ..................... | H02N 2/08 |
| | | | | | 310/323.05 |
| 5,596,241 A | * | 1/1997 | Seki | ......................... | H02N 2/08 |
| | | | | | 310/323.05 |

(Continued)

FOREIGN PATENT DOCUMENTS

| JP | 2012-016107 A | 1/2012 |
| JP | 2014-212682 A | 11/2014 |

OTHER PUBLICATIONS

U.S. Appl. No. 15/182,732, Hitoshi Nishitani, filed Jun. 15, 2016.

*Primary Examiner* — Thomas M Dougherty
(74) *Attorney, Agent, or Firm* — Venable LLP

(57) ABSTRACT

In a linear driving apparatus including a vibration wave motor, a sliding guide method is used as a guiding method for a moving member. The apparatus further includes a driving target body movable in a moving direction, a transmission member configured to engage with the driving target body, abut against the abutment part of the moving member, and transmit the driving force of the vibration wave motor to the driving target body, and a biasing member configured to apply a biasing force between the transmission member and the abutment part. The direction of a frictional contact force that the vibrator receives from the friction member and the direction of a biasing contact force that the abutment part receives from the biasing member are parallel and opposite, and the load center of the distribution load of the biasing contact force exists in the range of the outside shape of the vibrator.

17 Claims, 11 Drawing Sheets

(56) References Cited

U.S. PATENT DOCUMENTS

| | | | |
|---|---|---|---|
| 7,196,454 B2 * | 3/2007 | Baur | H02N 2/025 |
| | | | 310/323.01 |
| 7,265,480 B2 * | 9/2007 | Sasaki | G02B 7/102 |
| | | | 310/312 |
| 8,643,252 B2 | 2/2014 | Oda et al. | |
| 9,219,429 B2 | 12/2015 | Yamanaka et al. | |
| 9,397,586 B2 * | 7/2016 | Yamasaki | H02N 2/026 |
| 9,893,651 B2 * | 2/2018 | Yamamoto | H02N 2/026 |
| 2014/0125200 A1 | 5/2014 | Oda et al. | |
| 2016/0065092 A1 | 3/2016 | Yamanaka et al. | |
| 2016/0118913 A1 | 4/2016 | Nishitani et al. | |
| 2016/0126449 A1 | 5/2016 | Osawa et al. | |
| 2017/0315324 A1 * | 11/2017 | Noguchi | G02B 7/04 |

* cited by examiner

VIBRATION WAVE MOTOR, LINEAR DRIVING APPARATUS USING VIBRATION WAVE MOTOR, AND OPTICAL APPARATUS

BACKGROUND OF THE INVENTION

Field of the Invention

The present invention relates to a vibration wave motor, a linear driving apparatus using the vibration wave motor, and an optical apparatus.

Description of the Related Art

In a conventional ultrasonic motor, a high-frequency voltage is applied to a piezoelectric element to ultrasonically vibrate a vibrator fixed to the piezoelectric element. The ultrasonic vibration of the vibrator generates a driving force between a friction member and the vibrator pressed against the friction member. This motor can maintain high output even in a compact size. For example, Japanese Patent Application Laid-Open No. 2012-16107 discloses an ultrasonic motor using a compact vibrator. In addition, various contrivances for the efficient transmission of a driving force to a driving target body have been introduced into the ultrasonic motor. For example, in the ultrasonic motor disclosed in Japanese Patent Application Laid-Open No. 2014-212682, a rolling member is clamped by the resultant force of a pressing force given to the vibrator or its reactive force and the biasing force of a transmission member supported by a driving target body.

In order to downsize and simplify the ultrasonic motor described in Japanese Patent Application Laid-Open No. 2014-212682, there is proposed a sliding structure like that shown in FIG. 11, which is provided with guide shafts 600 extending in the moving direction (the X direction shown in FIG. 11) of a moving member 400, with sliding holes 400*a* fitted on the guide shafts 600 being formed in the moving member 400. In this sliding structure, the guide shafts 600 and the sliding holes 400*a* slidably guide the moving member 400. This sliding structure makes it possible to decide a size 400W in the moving direction X of the moving member 400 regardless of the movement amount of the moving member 400, and hence to implement the moving member 400 having the same length as that of the vibrator main body. In addition, since rolling balls can be omitted, the apparatus can be downsized and simplified. In this arrangement, however, the resultant force of the reactive force of the pressing force given to the vibrator and the biasing force of the transmission member supported by the driving target body acts as a drag (in a direction vertical to the drawing surface) on the guide shafts 600 and the sliding holes 400*a*. This increases the frictional force and decreases the driving force of the ultrasonic motor.

SUMMARY OF THE INVENTION

In order to solve the above problems, the present invention provides a vibration wave motor which employs a sliding guide and can be downsized and simplified without reduction in driving force. The present invention also provides a linear driving apparatus using such a vibration wave motor and an optical apparatus.

In order to solve the above problems, there is provided a linear driving apparatus comprising a vibration wave motor including a vibrator having a piezoelectric element configured to generate a vibration, a friction member configured to come into contact with a protruding portion provided on the vibrator, a moving member movable in a predetermined moving direction with respect to the friction member, a coupling member configured to couple the vibrator and the moving member with each other, a first guide member configured to guide the moving member in the moving direction, a press member configured to act on the moving member and capable of moving in the moving direction together with the moving member, and a second guide member configured to guide the press member in the moving direction, a driving target body movable in the moving direction, a transmission member configured to engage with the driving target body, abut against an abutment part of the moving member, and transmit a driving force of the vibration wave motor to the driving target body, and a biasing member configured to apply a biasing force between the transmission member and the abutment part, wherein a direction of a frictional contact force that the vibrator receives from the friction member and a direction of a biasing contact force that the abutment part receives from the biasing member are parallel and opposite, and a load center of a distribution load of the biasing contact force exists in a range of an outside shape of the vibrator.

According to the present invention, it is possible to provide a vibration wave motor which can be downsized and simplified without reduction in driving force. It is also possible to provide a linear driving apparatus using such a vibration wave motor and an optical apparatus.

Further features of the present invention will become apparent from the following description of exemplary embodiments with reference to the attached drawings.

DESCRIPTION OF THE EMBODIMENTS

Figure 1A:
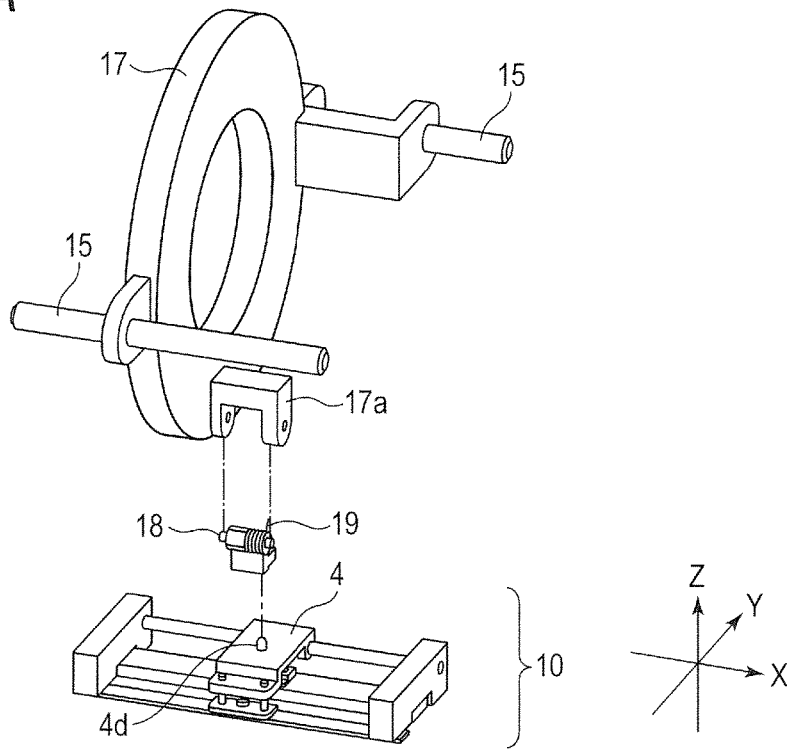
FIG. 1A is an exploded perspective view of a linear driving apparatus using a vibration wave motor 10 according to an embodiment of the present invention.

Preferred embodiments of the present invention will now be described in detail in accordance with the accompanying drawings.

The arrangement of a linear driving apparatus using a vibration wave motor (ultrasonic motor) 10 according to the present invention will be described below with reference to the accompanying drawings. Assume that the moving direction of a vibrator 1 of the vibration wave motor 10 is defined as the X direction, the direction of the press contact force of the vibrator 1 is defined as the Z direction, and a direction perpendicular to the X and Z directions is defined as the Y direction. With regard to all the drawings, the X, Y, and Z directions are defined as described above. Note that as for the Z direction, the vertical direction is used as needed in accordance with the drawing.

Figure 1B:
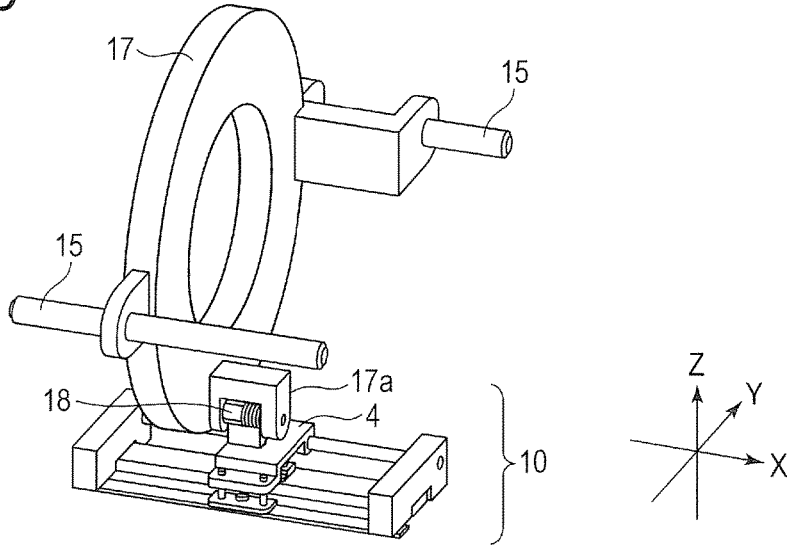
FIG. 1B is a perspective view of the linear driving apparatus.

The linear driving apparatus using the vibration wave motor 10 according to this embodiment will be described first. FIG. 1A is an exploded perspective view showing the linear driving apparatus using the vibration wave motor 10, which is exploded in the Z direction. FIG. 1B is a view of a completed linear driving apparatus. A driving target body 17 is a member that holds an optical element used for a photographing apparatus as a driving target. The driving target body 17 can reciprocally move in a moving direction X of a moving member 4 while being guided by guide shafts 15 when the vibration wave motor 10 outputs a driving force. The optical element generally means a lens such as a focus lens, but may be a prism or a mirror. Although the embodiment has exemplified an optical apparatus using the linear driving apparatus in which the driving target body 17 functions as a member configured to hold an optical element used for a photographing apparatus, the driving target body 17 can be applied to a component other than the member configured to hold the optical element.

A transmission member 18 is supported by a support portion 17a of the driving target body 17. The transmission member 18 is mounted on the moving member 4, together with a biasing member 19, so as to abut against an abutment part 4d of the moving member 4. The linear driving apparatus using the vibration wave motor 10 in the completed state shown in FIG. 1B is configured such that a driving force is transmitted from the vibrator 1 as a drive source (to be described later) to a coupling member 5, the moving member 4, the abutment part 4d, the transmission member 18, and the driving target body 17 in the order named to reciprocally move the driving target body 17 in the X direction.

Figure 2A:
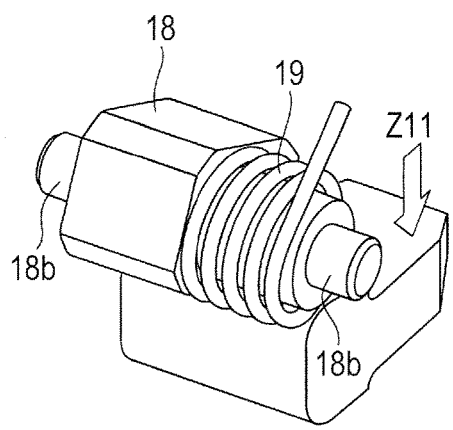
FIGS. 2A and 2B are perspective views, respectively, of a transmission member 18 and a biasing member 19 of the linear driving apparatus according the embodiment of the present invention.
Figure 2B:
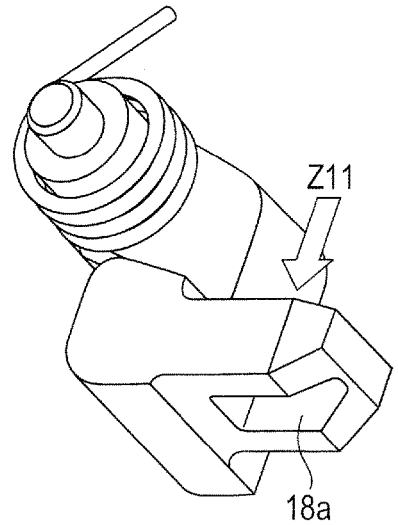
Figure 2B:
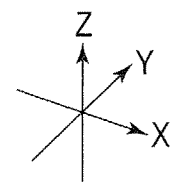
Figure 2B:
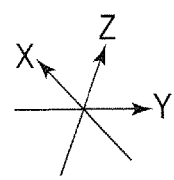
Figure 2C:
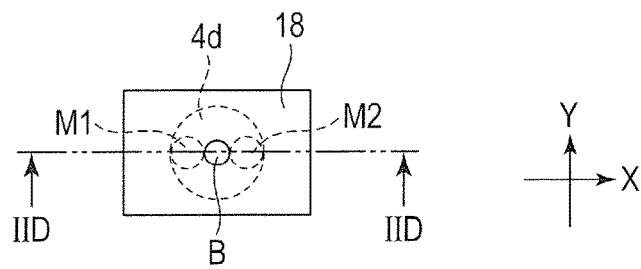
FIG. 2C is an enlarged view of an abutment portion.
Figure 2D:
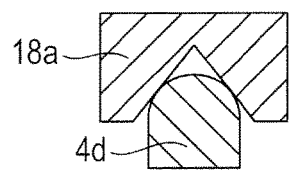
FIG. 2D is a sectional view of the abutment portion.
Figure 2D:
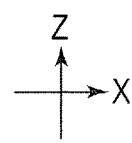

FIGS. 2A and 2B are perspective views, respectively, of the transmission member 18 and the biasing member 19. FIG. 2A is a view seen from above in the Z direction. FIG. 2B is a view seen from below in the Z direction. FIGS. 2C and 2D are enlarged views, respectively, of an abutment portion where the transmission member 18 abuts against the abutment part 4d of the moving member 4. FIG. 2C is a projection view seen from the Z direction. FIG. 2D is a sectional view taken along a cut line IID-IID in FIG. 2C. The transmission member 18 is supported by the support portion 17a of the driving target body 17 described above and abuts against the abutment part 4d of the moving member 4 to synchronously move the moving member 4 and the driving target body 17. The transmission member 18 has a concave portion 18a. The concave portion 18a is configured to come into biasing contact with the abutment part 4d. In this embodiment, the transmission member 18 is supported by the support portion 17a so as to be freely pivotal about a shaft 18b. It is however possible to select an arrangement in which the transmission member 18 is supported to be linearly movable. In addition, in the form of this embodiment, a concave shape is formed on the transmission member 18 side, and a convex shape is formed on the abutment part 4d side. It is however possible to select a form in which convex and concave portions are formed on the opposite sides to those in the above arrangement.

The biasing member 19 is a torsion coil spring, which applies a biasing force to the transmission member 18 to provide a biasing contact force Z11 between the transmission member 18 and the abutment part 4d. In this embodiment, the biasing member 19 is a torsion coil spring. However, it is possible to select a compression spring, tension spring, or leaf spring as long as it can provide the biasing contact force Z11.

Referring to FIG. 2D, the concave portion 18a has an almost V-shaped cross-section. The biasing contact force Z11 generated by the biasing member 19 has two distribution load areas M1 and M2 shown in FIG. 2C. A load center B of the distribution loads corresponds to the midpoint of them. Although this embodiment has exemplified the form in which there are two distribution load areas, even if the number of distribution load areas changes in accordance with the shapes of the transmission member 18 and the abutment part 4d, the load center B of the distribution loads can be regarded in the same manner.

Figure 3A:
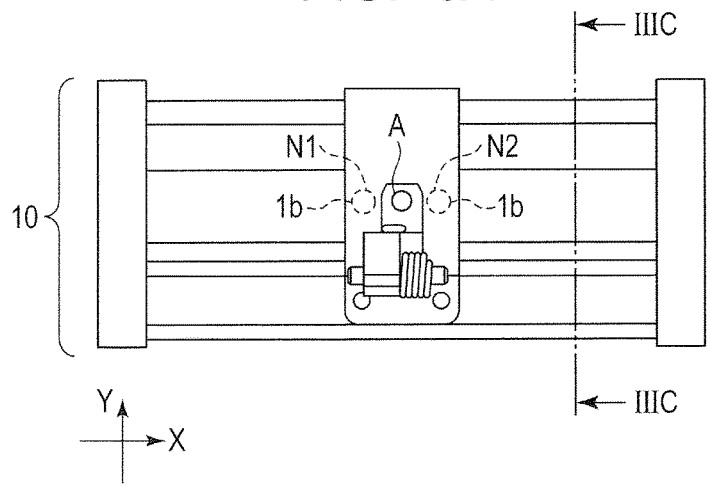
FIGS. 3A, 3B, 3C and 3D are views, respectively, showing a state in which the transmission member 18 and the biasing member 19 are assembled to the vibration wave motor 10 according to the embodiment of the present invention.
Figure 3C:
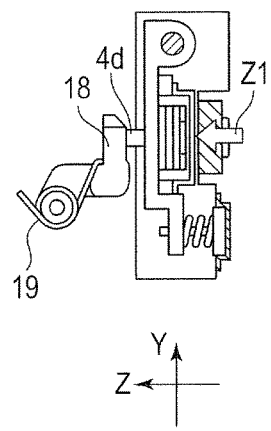
Figure 3B:
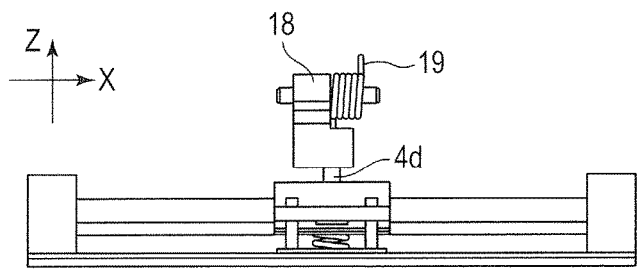
Figure 3D:
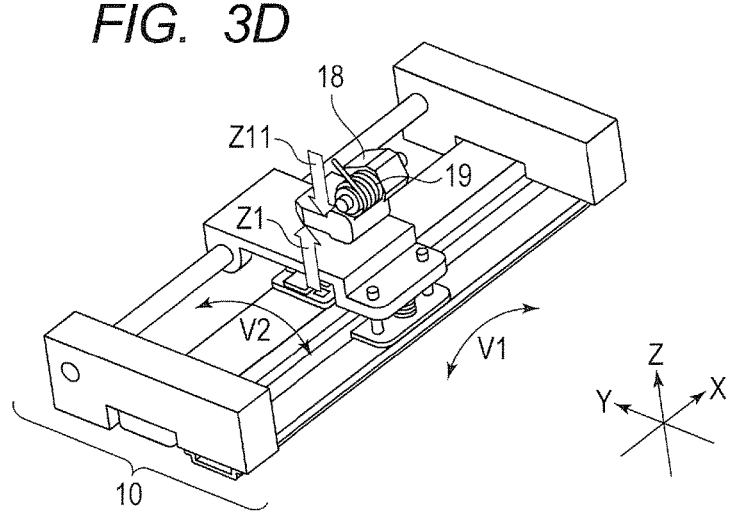

A mechanism through which the vibration wave motor 10 used for the linear driving apparatus according to this embodiment transmits a driving force to the driving target body 17 will be described next. FIG. 3A is a plan view showing how the transmission member 18 is mounted on the vibration wave motor 10 and biased by the biasing member 19. FIG. 3B is a front view of the vibration wave motor 10. FIG. 3C is a sectional view taken along a cut line IIIC-IIIC in FIG. 3A. FIG. 3D is a perspective view.

Referring to FIG. 3A, the distribution load areas of a frictional contact force Z1 between the vibrator 1 and a friction member 2 (to be described later) correspond to the ranges of protruding portions 1b of the vibrator 1. Therefore, the frictional contact force Z1 has two distribution load areas N1 and N2. A load center A of the distribution load areas corresponds to the midpoint of the distribution loads. Although this embodiment has exemplified the form in which there are two distribution load areas, even if the number of distribution load areas changes in accordance with the number of protruding portions 1b of the vibrator 1, the load center A of the distribution loads can be regarded in the same manner.

FIG. 3D shows how the frictional contact force Z1 and the biasing contact force Z11 act, and generated couples V1 and V2 act. Note that the shift of the relative positional relationship between the frictional contact force Z1 and the biasing contact force Z11 is emphatically shown. If the load center A of the frictional contact force Z1 coincides with the load center B of the biasing contact force Z11, the couple V1 around the Y-axis almost perpendicular to the moving direction X can be reduced to 0. Likewise, the couple V2 around the X-axis in the moving direction X can be reduced to 0. The outline of the linear driving apparatus using the vibration wave motor 10 according to this embodiment has been described above. Features of the vibration wave motor 10 according to each example will be described next.

Example 1

Figure 4A:
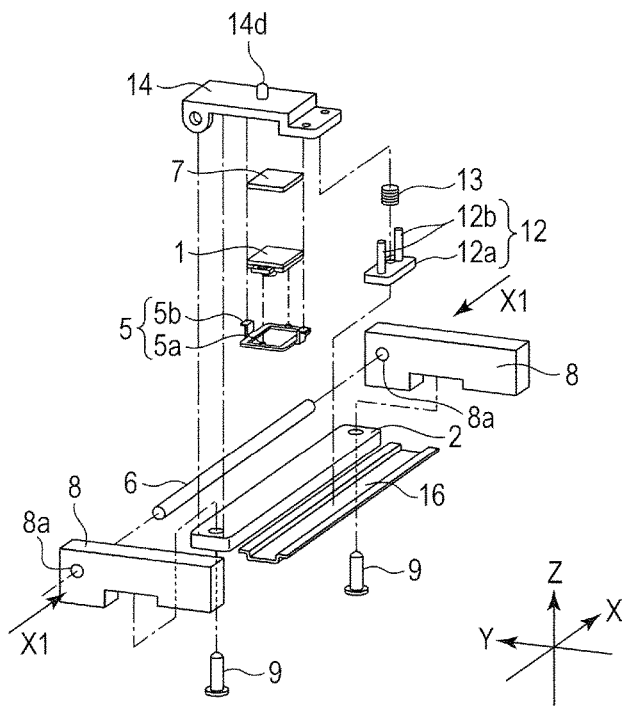
FIGS. 4A and 4B are exploded perspective views, respectively, of a vibration wave motor 10 according to Example 1 of the present invention.
Figure 4C:
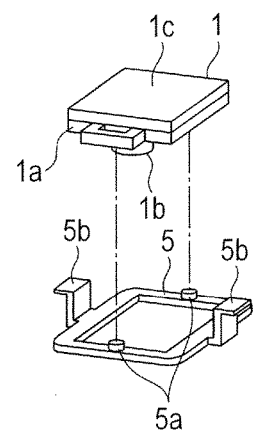
FIGS. 4C and 4D are exploded perspective views, respectively, of a vibrator 1 and a coupling member 5.
Figure 4B:
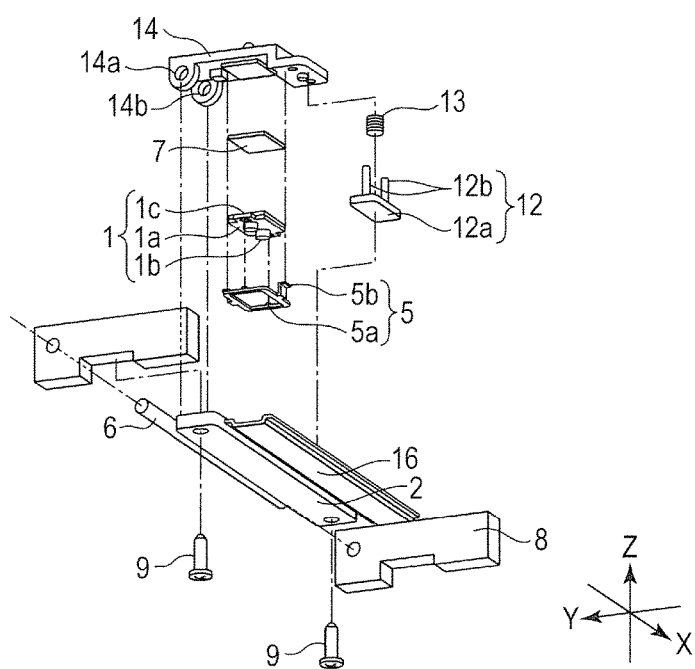
Figure 4D:
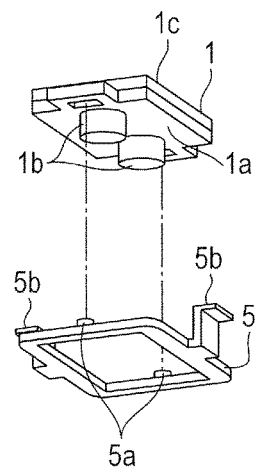

The arrangement of a vibration wave motor 10 according to Example 1 which is used for the linear driving apparatus according to the embodiment of the present invention will be described. FIGS. 4A and 4B are exploded perspective views, respectively, of the vibration wave motor 10. FIG. 4A is a view seen from above in the Z direction. FIG. 4B is a view seen from below in the Z direction. FIGS. 4C and 4D are exploded perspective views, respectively, showing enlargement of parts in FIGS. 4A and 4B.

A vibrator 1 is constituted by a piezoelectric element 1c that generates a vibration, a plate portion 1a, and two protruding portions 1b. The protruding portions 1b and the plate portion 1a can be integrally molded or assembled as separate components. The piezoelectric element 1c has a predetermined area polarized and is attached to the plate portion 1a. A power feeding means (not shown) applies a high-frequency voltage to the piezoelectric element 1c to generate vibration (ultrasonic vibration) with a frequency in an ultrasonic region. Since Japanese Patent Application Laid-Open No. 2012-16107 has described the principle of obtaining a driving force from the vibrator 1 by generating this vibration, a description of it will be omitted. Although Example 1 has exemplified the case in which the vibrator 1 has the two protruding portions 1b, the number of protruding portions 1b is selectable in accordance with a desired driving force. The vibrator 1 can reciprocally move in the X direction shown in FIGS. 4A and 4B.

A friction member 2 is arranged to face the vibrator 1 and is fixed to fixing members 8 while being in contact with the vibrator 1. Example 1 exemplifies a case in which the friction member 2 has a plate-like shape. However, a round bar shape or the like can also be selected as the shape of the friction member 2. In addition, a material such as a metal or ceramic material can be selected for the friction member 2 within a range that satisfies requirements for mechanical characteristics such as rigidity and surface properties.

A felt member 7 has a function of giving a press contact force received from a moving member 14 (to be described later) to the vibrator 1 and also has a function of preventing attenuation of a vibration. The moving member 14 can move in a moving direction X of the vibrator 1 with respect to the friction member 2. The moving member 14 includes sliding parts 14a and 14b each having a hole shape in which a first guide member 6 (to be described later) is fitted, and an abutment part 14d against which a transmission member 18 abuts. The sliding parts 14a and 14b and the abutment part 14d can be integrally molded on the moving member 14 or assembled as separate components.

A coupling member 5 is fixed to the vibrator 1 through first fixing portions 5a or fixed to the moving member 14 through second fixing portions 5b to couple the vibrator 1 to the moving member 14. This makes it possible to synchronously move the vibrator 1 and the moving member 14. The coupling member 5 has a property of exhibiting low rigidity in the Z direction so as not to inhibit a frictional contact force Z1 between the vibrator 1 and the friction member 2 and exhibiting high rigidity in the X direction to allow the vibrator 1 and the moving member 14 to synchronously move. When being fixed to the vibrator 1 through the first fixing portions 5a, the coupling member 5 is fixed to positions of the vibrator 1 which correspond to nodes of vibration or similar portions at which vibration is small by a method like bonding or welding (not shown). When being fixed to the moving member 14 through the second fixing portions 5b, the coupling member 5 is fixed to the moving member 14 by a method like bonding, welding, or screw fastening (not shown). Example 1 has exemplified the case in which the coupling member 5 is formed from one member having a frame-like shape. However, the coupling member 5 may be formed from a plurality of members or an arbitrary material and shape can be selected for the coupling member 5 within a range that satisfies the requirement for the above rigidity characteristic.

The first guide member 6 is a round bar for slidably guiding the moving member 14 in the X direction. The first guide member 6 is a sliding guide that is fitted in the sliding parts 14a and 14b of the moving member 14 and need not rolling balls and the like. Example 1 exemplifies a case in which the round bar is used. However, a square bar or plate member can be selected as long as the shapes of the sliding parts 14a and 14b are made to comply with the guide member.

A press member 13 is a compression spring that is arranged such that the upper end of the press member 13 acts on the moving member 14, and the lower end acts on an auxiliary moving member 12. The auxiliary moving member 12 includes a flat portion 12a and two protruding portions 12b. The two protruding portions 12b are fitted in the hole portions of the moving member 14. This fitting allows the movement of the auxiliary moving member 12 in the Z direction with respect to the moving member 14 but restricts the movement in the X direction. Hence, the auxiliary moving member 12 moves in the X direction together with the moving member 14. Example 1 has exemplified the case in which the press member 13 is the compression spring. However, a tension spring or leaf spring, or a magnet that generates a magnetic force can be selected as long as it can generate a desired force to be described later. Note that the moving member 14 and the auxiliary moving member 12 correspond to a first moving member and a second moving member, respectively, described in the appended claims.

A second guide member 16 is a rail-shaped plate member that guides the auxiliary moving member 12 in the X direction. The auxiliary moving member 12 moves in synchronism with the moving member 14 while making the flat portion 12a slide on the second guide member 16. Example 1 has exemplified the case in which the flat portion 12a directly slides on the second guide member 16. However, an arrangement with a friction reducing sheet member or rotating roller member provided on the second guide member 16 can be selected as long as a desired durability is satisfied. An arrangement in which the auxiliary moving member 12 is omitted to make the lower end of the press member 13 directly slide on the second guide member 16 can also be selected as long as a desired durability is satisfied. Example 1 has exemplified the case in which the second guide member 16 is a plate member. However, any other shape like a round bar member can also be selected.

The fixing members 8 hold the first guide member 6 fitted in two holes 8a and also support the second guide member 16. The fixing members 8 are assembled in an X1 direction shown in FIG. 4A. The friction member 2 is then fixed to the fixing members 8 by being fastened with screws 9. The fixing members 8 are supported by a fixing portion (not shown). As a holding method for the first guide member 6 and the second guide member 16 and a fixing method for the friction member 2, arbitrary methods can be selected.

Figure 5A:
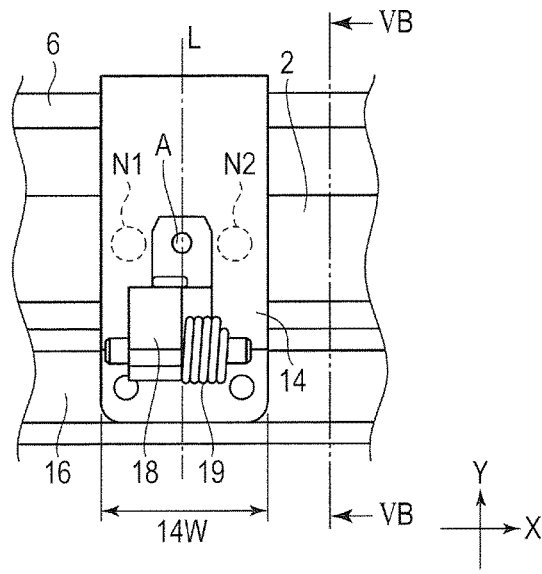
FIGS. 5A, 5B, 5C, 5D and 5E are views, respectively, showing a structure and the action of forces according to Example 1 of the present invention.
Figure 5B:
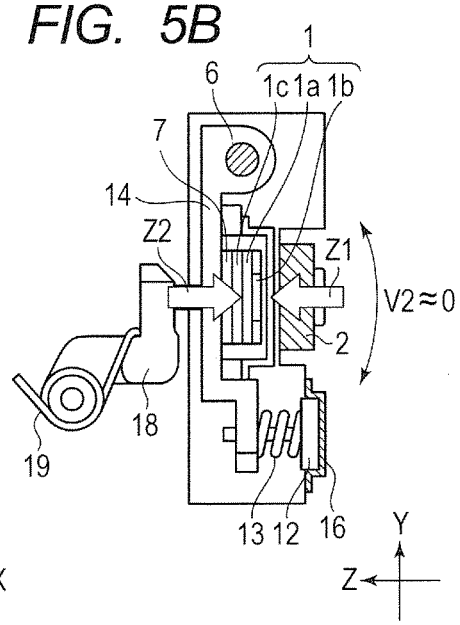
Figure 5C:
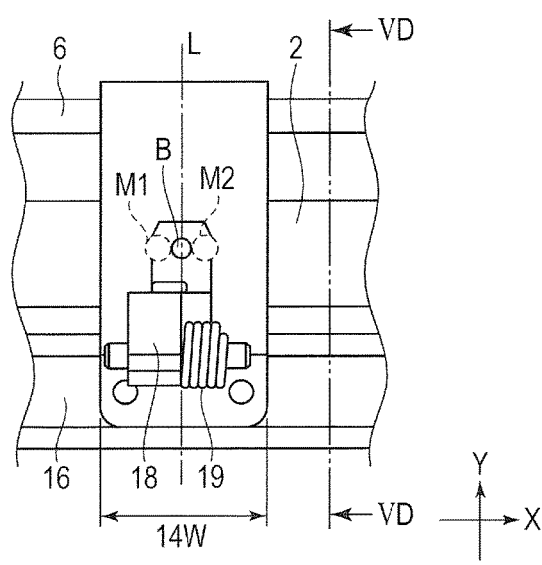
Figure 5D:
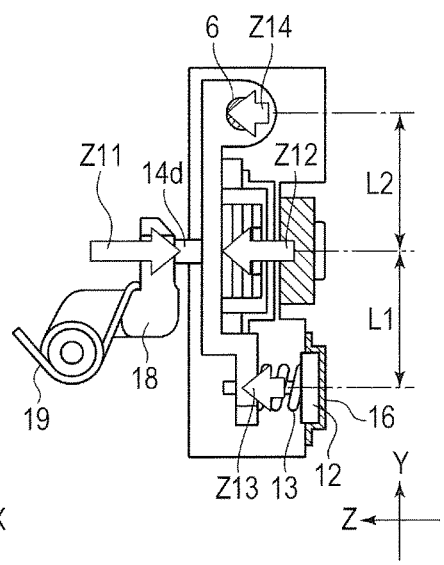
Figure 5E:
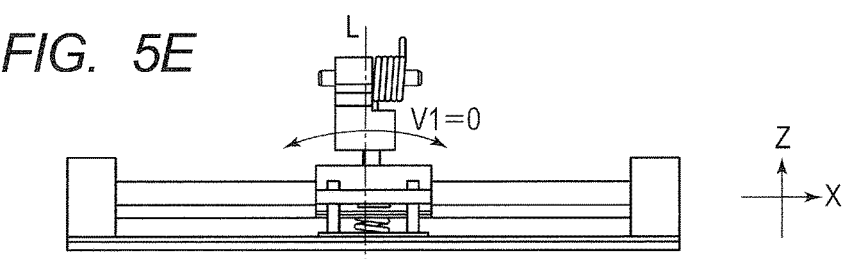

Forces acting inside the vibration wave motor 10 according to Example 1 will be described next. FIGS. 5A and 5C are enlarged views, respectively, of a vicinity of the moving member 14 on a plane. FIG. 5B is a sectional view taken along a cut line VB-VB in FIG. 5A. FIG. 5D is a sectional view taken along a cut line VD-VD in FIG. 5C. FIG. 5E is a front view. The vibrator 1, the felt member 7, the auxiliary moving member 12, the press member 13, the moving member 14, the transmission member 18, and a biasing member 19 are components which move in the X direction, to which the friction member 2, the first guide member 6, and the second guide member 16 are fixed.

External forces acting on the vibrator 1 are the frictional contact force Z1 that the protruding portions 1b of the vibrator 1 receive from the friction member 2 shown in FIG. 5B, and a contact force Z2 that the piezoelectric element 1c of the vibrator 1 receives from the moving member 14 via the felt member 7. Considering the balance on the X-Z plane of the vibrator 1, the frictional contact force Z1 and the contact force Z2 are equal in magnitude and opposite in direction. As shown in FIG. 5A, the distribution load areas of the frictional contact force Z1 are areas N1 and N2 that are the projections of the protruding portions 1b of the vibrator 1. The load center is a load center A, as described above.

External forces acting on the moving member 14 are contact forces Z11, Z12, Z13, and Z14 shown in FIG. 5D. The contact force Z11 (biasing contact force Z11) is a force that the abutment part 14d of the moving member 14 receives from the biasing member 19 via the transmission member 18. This force is set by the spring force of the biasing member 19. The contact force Z12 is a force that the moving member 14 receives from the vibrator 1 via the felt member 7. Since the contact force Z12 is the reaction of the contact force Z2, the contact force Z12 and the contact force Z2 are equal in magnitude and opposite in direction. The contact force Z13 is a force that the moving member 14 receives from the press member 13. This force is set by the spring force of the press member 13. The contact force Z14 is a force that the moving member 14 receives from the first guide member 6.

In Example 1, the directions of the forces are illustrated assuming that the biasing contact force Z11 is larger than the contact force Z12. Using sizes L1 and L2 shown in FIG. 5D and considering the balance on the Y-Z plane of the moving member 14, we obtain $$Z13 = (L2/(L1+L2)) \times (Z11-Z12) \quad \text{(i)}$$

$$Z14 = (L1/L2) \times Z13 \quad \text{(ii)}.$$

To simplify the calculation, the sizes L1 and L2 in FIG. 5D are assumed to be almost equal. Since the contact force Z12 is equal to the frictional contact force Z1 in magnitude, as described above, the sum of the contact force Z13 and the contact force Z14 equals the difference between the frictional contact force Z1 and the biasing contact force Z11. As shown in FIG. 5C, the distribution load areas of the biasing contact force Z11 are areas M1 and M2 that are the projections of the contact areas between the abutment part 14d and a concave portion 18a of the transmission member 18. The load center is a load center B, as described above.

A frictional force is generated between the moving member 14 and the first guide member 6 by the reaction of the contact force Z14, and a frictional force is generated between the auxiliary moving member 12 and the second guide member 16 by the reaction of the contact force Z13. As described above, the sum of the contact force Z13 and the contact force Z14 equals the difference between the frictional contact force Z1 and the biasing contact force Z11. For this reason, a value obtained by multiplying the difference by a friction coefficient corresponds to the frictional force generated by sliding.

Features of Example 1 will be described below. The first feature of this example is that the direction of the frictional contact force Z1 that the vibrator 1 receives from the friction member 2 and the direction of the biasing contact force Z11 that the abutment part 14d receives from the biasing member 19 are parallel and opposite, as shown in FIGS. 5B, 5D, and 5E. According to the first feature, the sum of the frictional forces generated between the moving member 14 and the first guide member 6 and between the auxiliary moving member 12 and the second guide member 16 equals a value obtained by multiplying the difference between the frictional contact force Z1 and the biasing contact force Z11 by a friction coefficient. The frictional force serves as a sliding resistance acting when the moving member 14 and the auxiliary moving member 12 move in the X direction. Hence, if the frictional force is small, a decrease in the driving force of a motor is suppressed.

Figure 11:
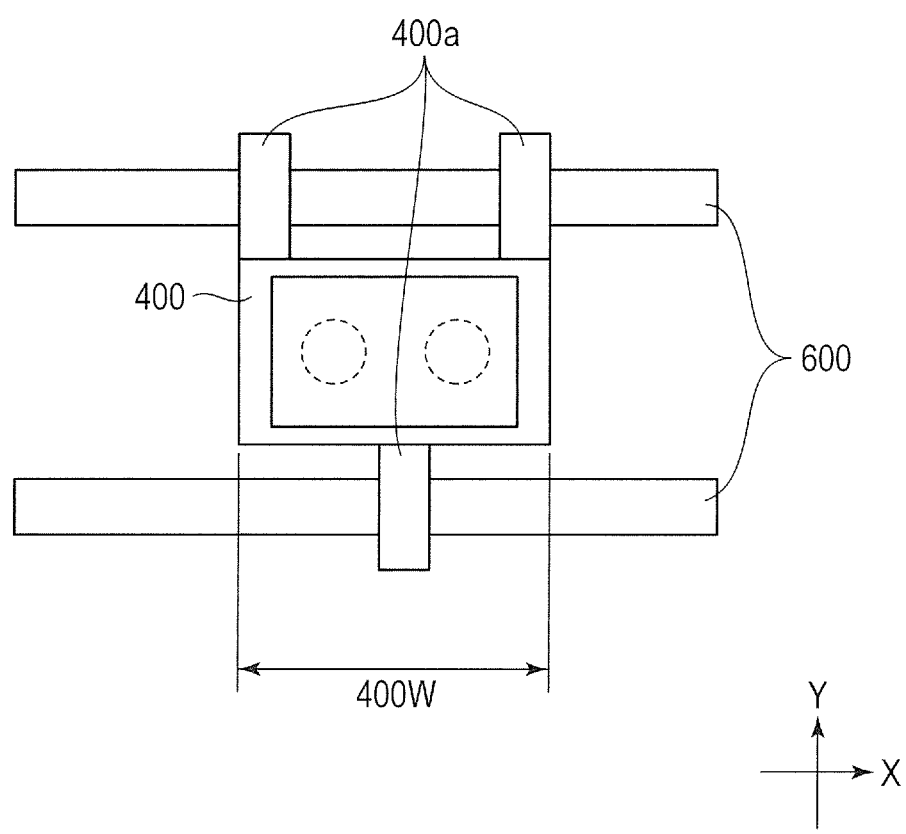
FIG. 11 is a view showing an example of related art.

The arrangement of Example 1 and the arrangement of a related art (for example, the arrangement of the related art shown in FIG. 11) will be compared next. In the arrangement of the related art, no rolling balls are employed on the guide member, and a simple sliding guide is formed. For this reason, a frictional force generated on a guide shaft 600 has a value obtained by multiplying the sum of the biasing contact force and the frictional contact force by a friction coefficient. In the arrangement of the related art, the frictional force is large, and the driving force of the motor thus greatly decreases. Hence, to reduce the frictional force, rolling balls may be employed. However, when rolling balls are employed, grooves to make the rolling balls roll need to be formed. This makes a size 400W of a moving member 400 in the traveling direction larger than that of the vibrator, and the apparatus cannot be downsized and simplified.

In Example 1, however, the frictional force generated on the first guide member 6 and the second guide member 16 has a value obtained by multiplying the difference between the biasing contact force Z11 and the frictional contact force Z1 by a friction coefficient. Hence, since the frictional force is reduced as compared to the arrangement of the related art, the driving force of the motor does not decrease even in the arrangement in which rolling balls need not be employed, and a simple sliding guide is formed. As a result, grooves to make the rolling balls roll need not be formed in the moving member 14. It is therefore possible to make a size 14W of the moving member 14 in the moving direction X equal to or smaller than the size of the vibrator 1 in the moving direction X.

The second feature of Example 1 is that the load center A of the distribution load of the frictional contact force Z1 and the load center B of the distribution load of the biasing contact force Z11 are aligned on a straight line L along a direction Y perpendicular to both the moving direction X and a direction Z of the frictional contact force Z1, as shown in FIGS. 5A, 5C, and 5E. According to the second feature, since no couple V1 around the Y-axis shown in FIG. 5E is generated in the moving member 14, the moving body can reciprocally move with high position accuracy without tilting around the Y-axis. Note that the load center B of the distribution load of the biasing contact force Z11 exists in the range of the outside shape of the vibrator 1.

As described above, the vibration wave motor 10 according to Example 1 can use, as the guide method for the moving member 14, a sliding guide capable of downsizing and simplifying the vibration wave motor without decreasing the driving force of the vibration wave motor 10. In addition, the linear driving apparatus can also be downsized and simplified. In Example 1, on a plane perpendicular to the direction of the frictional contact force Z1, the load center A of the distribution load of the frictional contact force Z1 and the load center B of the distribution load of the biasing contact force Z11 are aligned in the moving direction X, and the load center A and the load center B almost coincide with each other, as shown in FIGS. 5A and 5C. As a result, the couple V2 shown in FIG. 5B is hardly generated. Hence, when the frictional contact force Z1 is made almost equal to the biasing contact force Z11, the frictional force serving as a sliding resistance is reduced to almost 0. It is therefore possible to reduce a decrease in the driving force of the vibration wave motor 10 caused by the frictional force to almost 0.

Note that in Example 1, the effects have been described assuming that the sizes L1 and L2 are almost equal. However, even if the sizes L1 and L2 are different, the contact force Z13 and the contact force Z14 are decided by equations (i) and (ii). Hence, since the frictional force generated on the first guide member 6 and the second guide member 16 has a value obtained by multiplying the difference between the biasing contact force Z11 and the frictional contact force Z1 by a friction coefficient, the same effects as described above can be obtained.

Example 2

Regarding Example 2, a description of parts common to Example 1 will be omitted, and only different points will be described. In Example 1, the biasing contact force Z11 is larger than the frictional contact force Z1, and considering the balance on the X-Z plane of the moving member 14, the contact force Z13 acts in the same direction as the frictional contact force Z1. On the other hand, in Example 2, a biasing contact force Z21 is smaller than a frictional contact force Z1, and considering the balance on the X-Z plane of a moving member 24, a contact force Z23 acts in the same direction as the biasing contact force Z21, as shown in FIGS. 6A to 6E. In Example 2 in which such forces act, the direction in which the moving member 24 is pressed by a press member 23 is reverse to that in Example 1, and the mounting directions of an auxiliary moving member 22 and a second guide member 26 are also reverse.

Figure 6A:
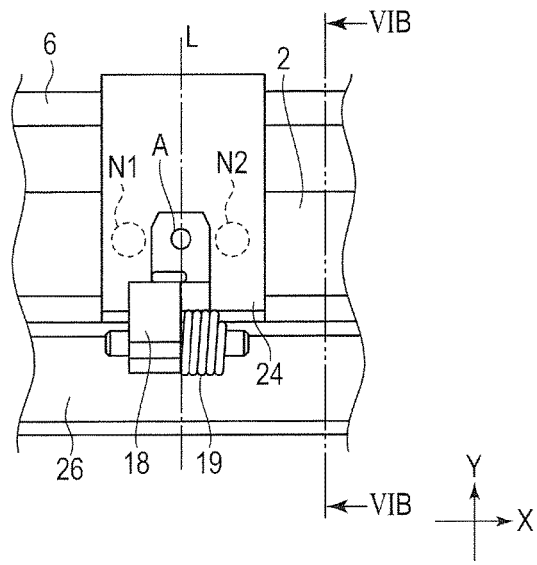
FIGS. 6A, 6B, 6C, 6D and 6E are views, respectively, showing a structure and the action of forces according to Example 2 of the present invention.
Figure 6B:
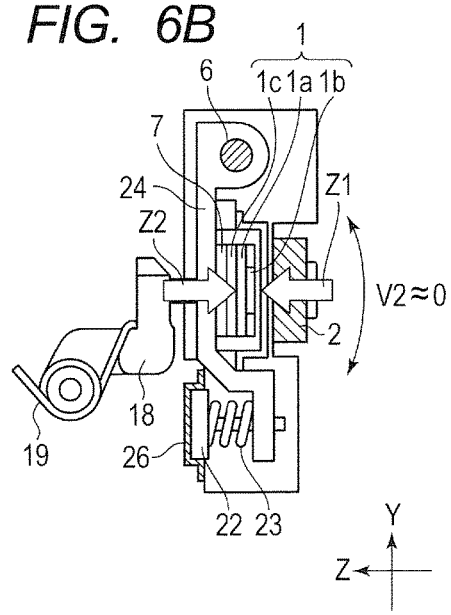
Figure 6C:
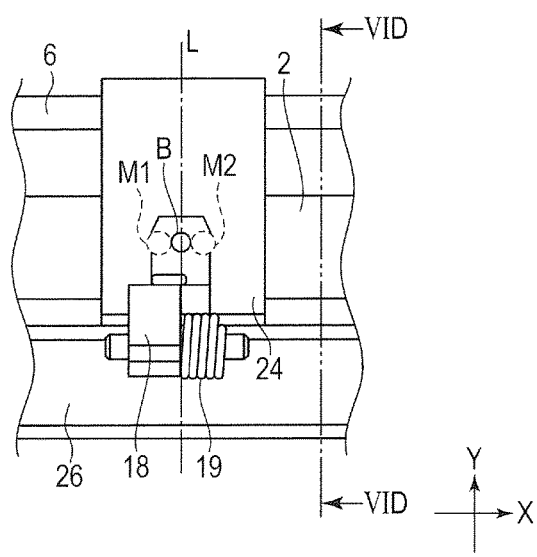
Figure 6D:
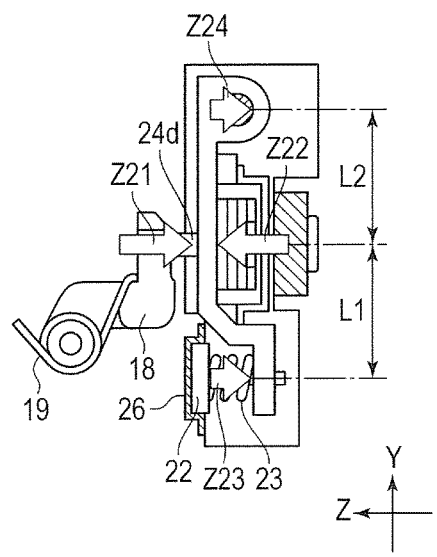
Figure 6E:
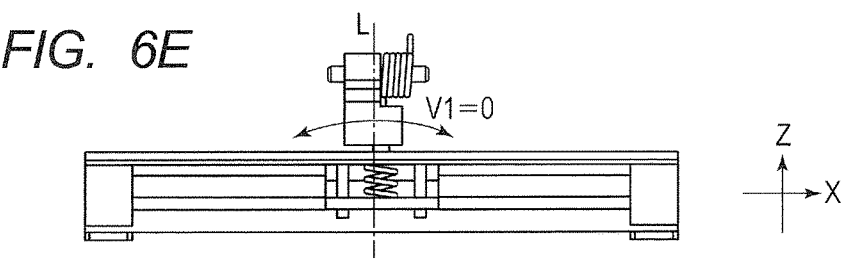

As for the above-described arrangement, using sizes L1 and L2 shown in FIG. 6D and considering the balance on the Y-Z plane of the moving member 24, we obtain $$Z23=(L2/(L1+L2))\times(Z22-Z21) \tag{iii}$$

$$Z24=(L1/L2)\times Z23 \tag{iv}$$

To simplify the calculation, the sizes L1 and L2 in FIG. 6D are assumed to be almost equal. Since a contact force Z22 is equal to the frictional contact force Z1 in magnitude, as in Example 1, the sum of the contact force Z23 and a contact force Z24 equals the difference between the frictional contact force Z1 and the biasing contact force Z21. As a result, the frictional force as the cause of a decrease in the driving force can be reduced, as in Example 1.

As described above, a vibration wave motor 10 having the arrangement of Example 2 can use, as the guide method for the moving member 24, a sliding guide capable of downsizing and simplifying the vibration wave motor without decreasing the driving force, as in Example 1. In addition, the linear driving apparatus can also be downsized and simplified. Note that in Example 2, the effects have been described assuming that the sizes L1 and L2 are almost equal. However, even if the sizes L1 and L2 are different, the contact force Z23 and the contact force Z24 are decided by equations (iii) and (iv). Hence, since the frictional force generated on a first guide member 6 and the second guide member 26 has a value obtained by multiplying the difference between the biasing contact force Z21 and the frictional contact force Z1 by a friction coefficient, the same effects as described above can be obtained.

Example 3

Regarding Example 3, a description of parts common to Example 1 will be omitted, and only different points will be described. In Example 1, the first guide member 6, the vibrator 1, and the second guide member 16 are sequentially arranged in the Y direction. On the other hand, in Example 3, a second guide member 36, a first guide member 6, and a vibrator 1 are sequentially arranged in the Y direction, as shown in FIGS. 7A to 7E. More specifically, a moving member 34 is pressed by a press member 33 in the −Z direction, and an auxiliary moving member 32 against which the press member 33 abuts is guided by the second guide member 36.

Figure 7A:
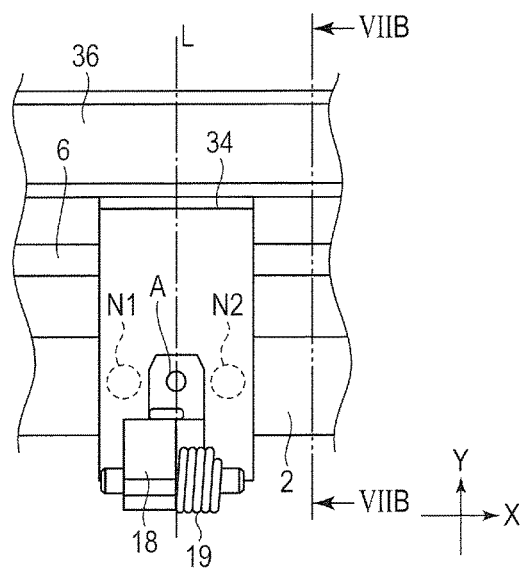
FIGS. 7A, 7B, 7C, 7D and 7E are views, respectively, showing a structure and the action of forces according to Example 3 of the present invention.
Figure 7B:
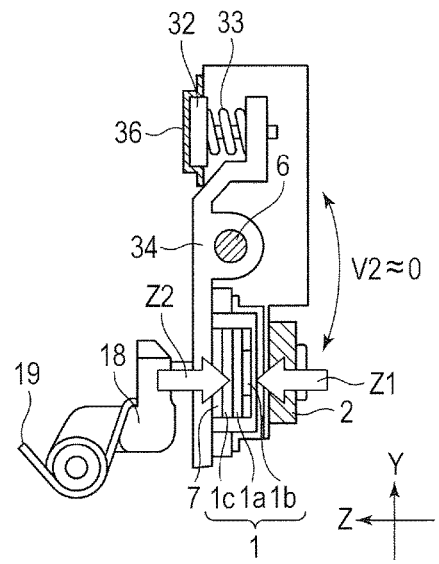
Figure 7C:
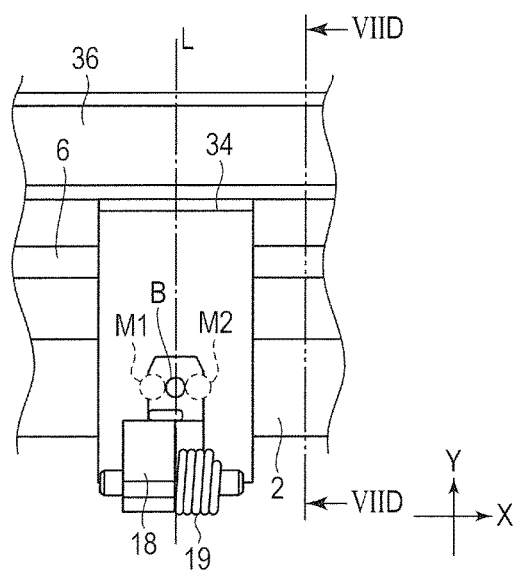
Figure 7D:
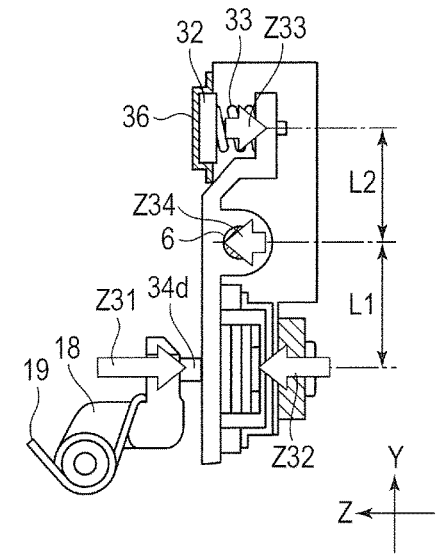
Figure 7E:
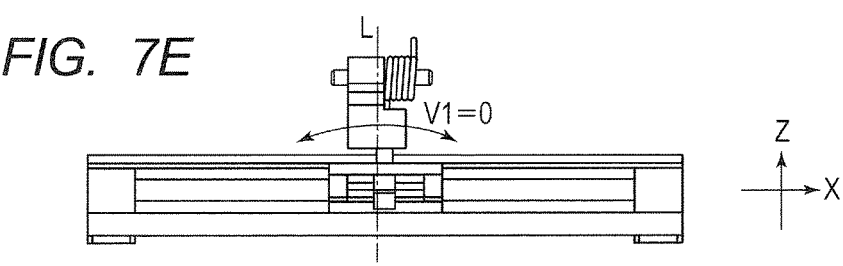

As for the above-described arrangement, using sizes L1 and L2 shown in FIG. 7D and considering the balance on the Y-Z plane of the moving member 34, we obtain $$Z33=(L1/L2)\times(Z31-Z32) \tag{v}$$

$$Z34=((L1+L2)/L1)\times Z33 \tag{vi}$$

To simplify the calculation, the sizes L1 and L2 in FIG. 7D are assumed to be almost equal. Since a contact force Z32 is equal to a frictional contact force Z1 in magnitude, as in Example 1, the sum of a contact force Z33 and a contact force Z34 is three times larger than the difference between the frictional contact force Z1 and a biasing contact force Z31. As a result, if the frictional contact force Z1 is almost equal to the biasing contact force Z31 in magnitude, the frictional force as the cause of a decrease in the driving force can be reduced, as in Example 1.

As described above, a vibration wave motor 10 having the arrangement of Example 3 can use, as the guide method for the moving member 34, a sliding guide capable of downsizing and simplifying the vibration wave motor without decreasing the driving force, as in Example 1. In addition, the linear driving apparatus can also be downsized and simplified. Note that in Example 3, the effects have been described assuming that the sizes L1 and L2 are almost equal. However, even if the sizes L1 and L2 are different, the contact force Z33 and the contact force Z34 are decided by equations (v) and (vi). Hence, since the frictional force generated on the first guide member 6 and the second guide member 36 has a value obtained by multiplying ((2×L1+L2)/L2) times of the difference between the biasing contact force Z31 and the frictional contact force Z1 by a friction coefficient, the same effects as described above can be obtained.

Example 4

Regarding Example 4, a description of parts common to Example 3 will be omitted, and only different points will be described. In Example 3, the biasing contact force Z31 is larger than the frictional contact force Z1, and considering the balance on the X-Z plane of the moving member 34, the contact force Z33 acts in the same direction as the biasing contact force Z31. On the other hand, in Example 4, a biasing contact force Z41 is smaller than a frictional contact force Z1, and considering the balance on the X-Z plane of a moving member 44, a contact force Z43 acts in the same direction as the frictional contact force Z1, as shown in FIGS. 8A to 8E. In Example 4 in which such forces act, the moving member 44 is pressed by a press member 43 in the +Z direction, and an auxiliary moving member 42 against which the press member 43 abuts is guided by a second guide member 46.

Figure 8A:
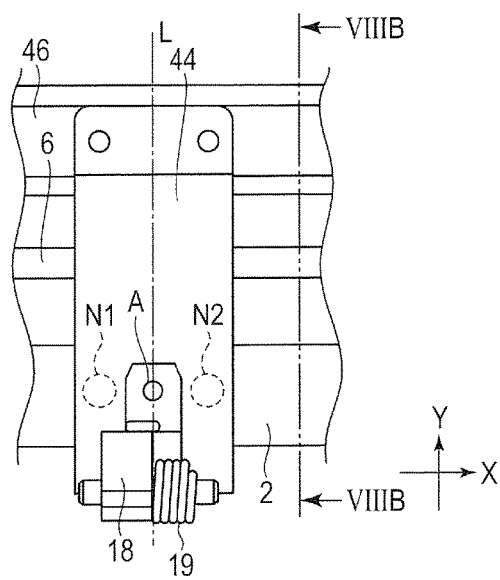
FIGS. 8A, 8B, 8C, 8D and 8E are views, respectively, showing a structure and the action of forces according to Example 4 of the present invention.
Figure 8B:
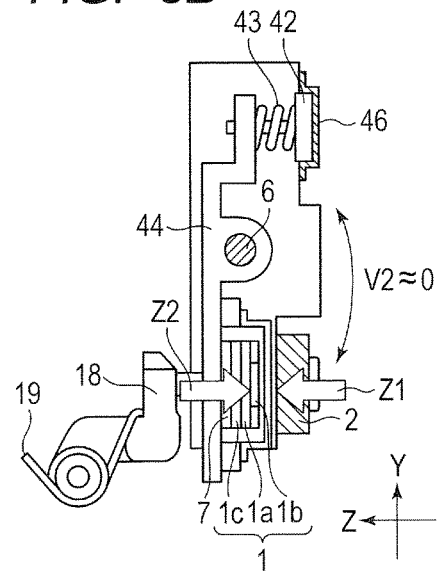
Figure 8C:
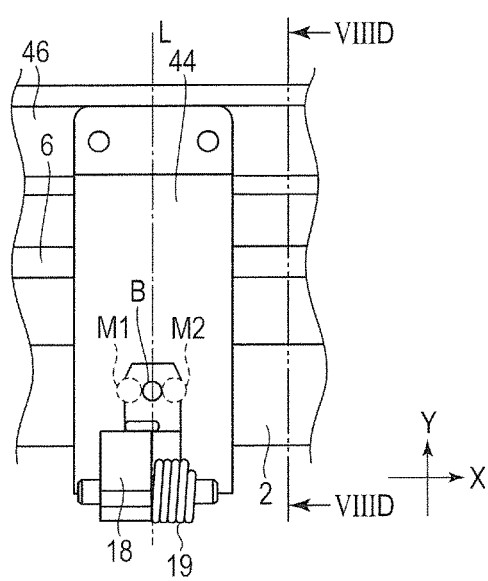
Figure 8D:
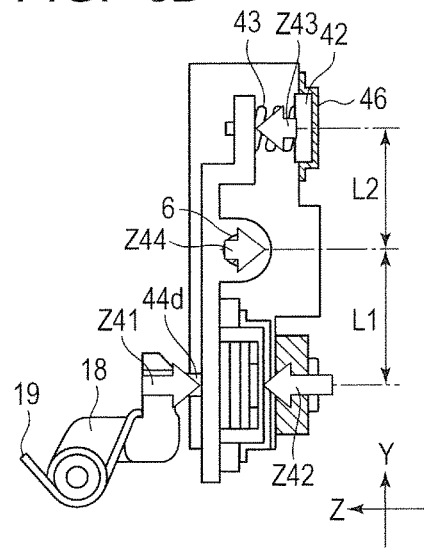
Figure 8E:
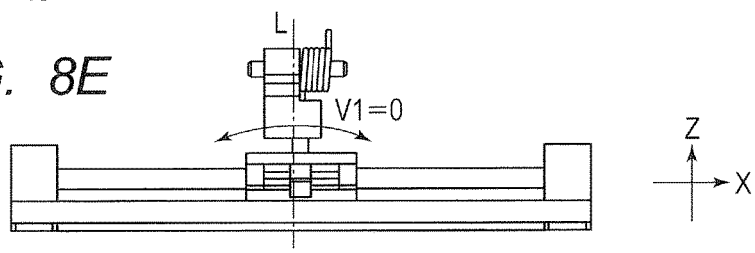

Even in the above-described arrangement, using sizes L1 and L2 shown in FIG. 8D and considering the balance on the Y-Z plane of the moving member 44, we obtain $$Z43 = (L1/L2) \times (Z42 - Z41) \qquad \text{(vii)}$$

$$Z44 = ((L1+L2)/L1) \times Z43 \qquad \text{(viii)}.$$

To simplify the calculation, the sizes L1 and L2 in FIG. 8D are assumed to be almost equal. Since a contact force Z42 is equal to the frictional contact force Z1 in magnitude, as in Example 3, the sum of the contact force Z43 and a contact force Z44 is three times larger than the difference between the frictional contact force Z1 and the biasing contact force Z41. As a result, if the frictional contact force Z1 is almost equal to the biasing contact force Z41 in magnitude, the frictional force as the cause of a decrease in the driving force can be reduced, as in Example 1.

As described above, a vibration wave motor 10 having the arrangement of Example 4 can use, as the guide method for the moving member 44, a sliding guide capable of downsizing and simplifying the vibration wave motor without decreasing the driving force, as in Example 1. In addition, the linear driving apparatus can also be downsized and simplified. Note that in Example 4, the effects have been described assuming that the sizes L1 and L2 are almost equal. However, even if the sizes L1 and L2 are different, the contact force Z43 and the contact force Z44 are decided by equations (vii) and (viii). Hence, since the frictional force generated on a first guide member 6 and the second guide member 46 has a value obtained by multiplying ((2×L1+L2)/L2) times of the difference between the biasing contact force Z41 and the frictional contact force Z1 by a friction coefficient, the same effects as described above can be obtained.

(First Modification)

Figure 9A:
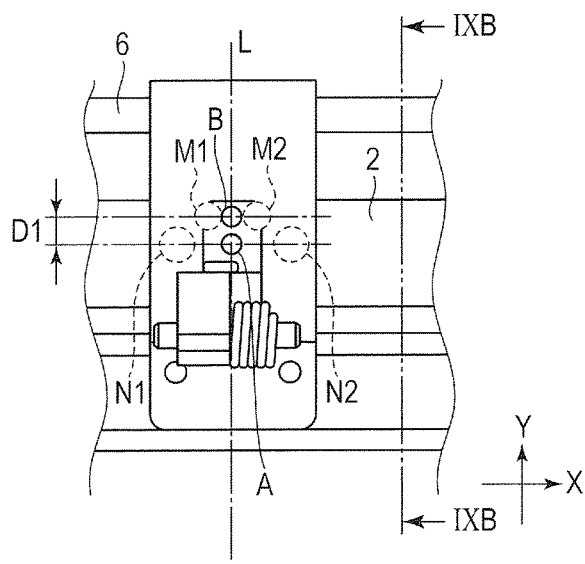
FIGS. 9A and 9B are views, respectively, showing the action of forces according to the first modification of the present invention.
Figure 9B:
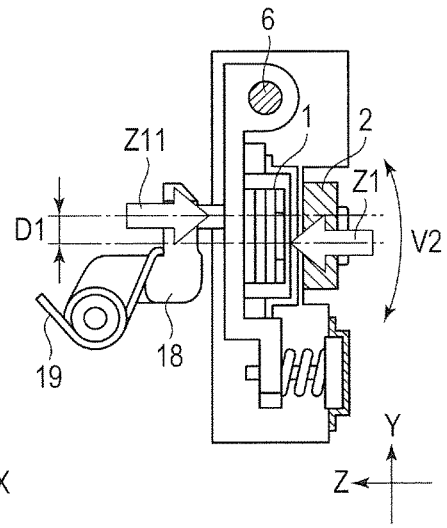

FIGS. 9A and 9B show the first modification constituted using the vibration wave motor 10 of one of Examples 1 to 4 described above. FIG. 9A is a partially enlarged view on a plane. FIG. 9B is a sectional view taken along a cut line IXB-IXB in FIG. 9A. According to the first modification, on the projections on the X-Y plane, the load center A of the distribution load of the frictional contact force Z1 and the load center B of the distribution load of the biasing contact force Z11 are aligned in the Y direction perpendicular to the moving direction X and the Z direction of the frictional contact force Z1 but are not aligned in the moving direction X.

That is, the load center A and the load center B do not coincide with each other and are spaced apart from each other to a certain extent. Assume that this degree of separation is defined as a shift amount D1. Note that the shift amount D1 is emphatically shown. In this arrangement, the value of the shift amount D1 is set small, and the couple V2 shown in FIG. 9B is intentionally made to exist as a very small value. The presence of the very small couple V2 can shift backlash around the moving member to one side, and hence the arrangement can obtain the effect of reducing the vibration of the moving member and preventing the generation of unnecessary vibration and noise of the apparatus.

(Second Modification)

Figure 9C:
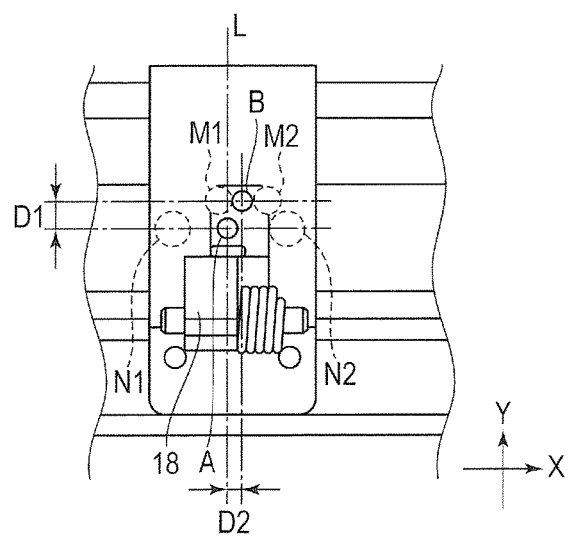
FIGS. 9C and 9D are views, respectively, showing the action of forces according to the second modification of the present invention.
Figure 9D:
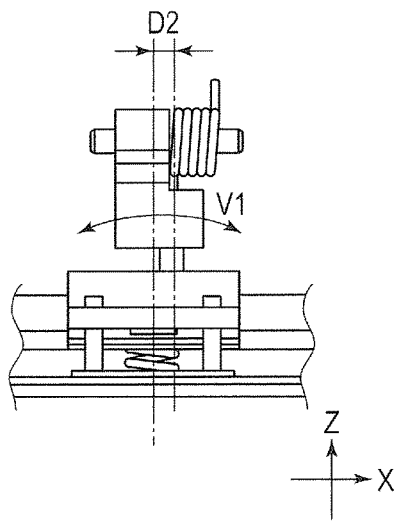

FIGS. 9C and 9D show the second modification constituted using the vibration wave motor 10 of one of Examples 1 to 4 described above. FIG. 9C is a partially enlarged view on a plane. FIG. 9D is a partially enlarged view on the front. According to the second modification, on the projections on the X-Y plane, the load center A of the distribution load of the frictional contact force Z1 and the load center B of the distribution load of the biasing contact force Z11 fall within the range of the outside shape of the vibrator 1 but are not aligned in both the moving direction X and the Y direction perpendicular to the moving direction X.

That is, the load center A and the load center B do not coincide with each other and are spaced apart from each other to a certain extent. Assume that as for this degree of separation, the shift amount D1 in the Y direction perpendicular to both the load center A and the load center B and a shift amount D2 in the moving direction X are defined. Note that both the shift amount D1 and the shift amount D2 are emphatically shown. In this arrangement, the value of the shift amount D2 is set small, and the couple V1 shown in FIG. 9D is intentionally made to exist as a very small value. The presence of the very small couple V1 can shift backlash around the moving member to one side, and hence the arrangement can obtain the effect of reducing the vibration of the moving member and preventing the generation of unnecessary vibration and noise of the apparatus. As described above, even if the load center A of the distribution load of the frictional contact force Z1 and the load center B of the distribution load of the biasing contact force Z11 are not aligned in either or both of the moving direction X and the Y direction perpendicular to the moving direction X, similar effects can be obtained.

(Third Modification)

Figure 10:
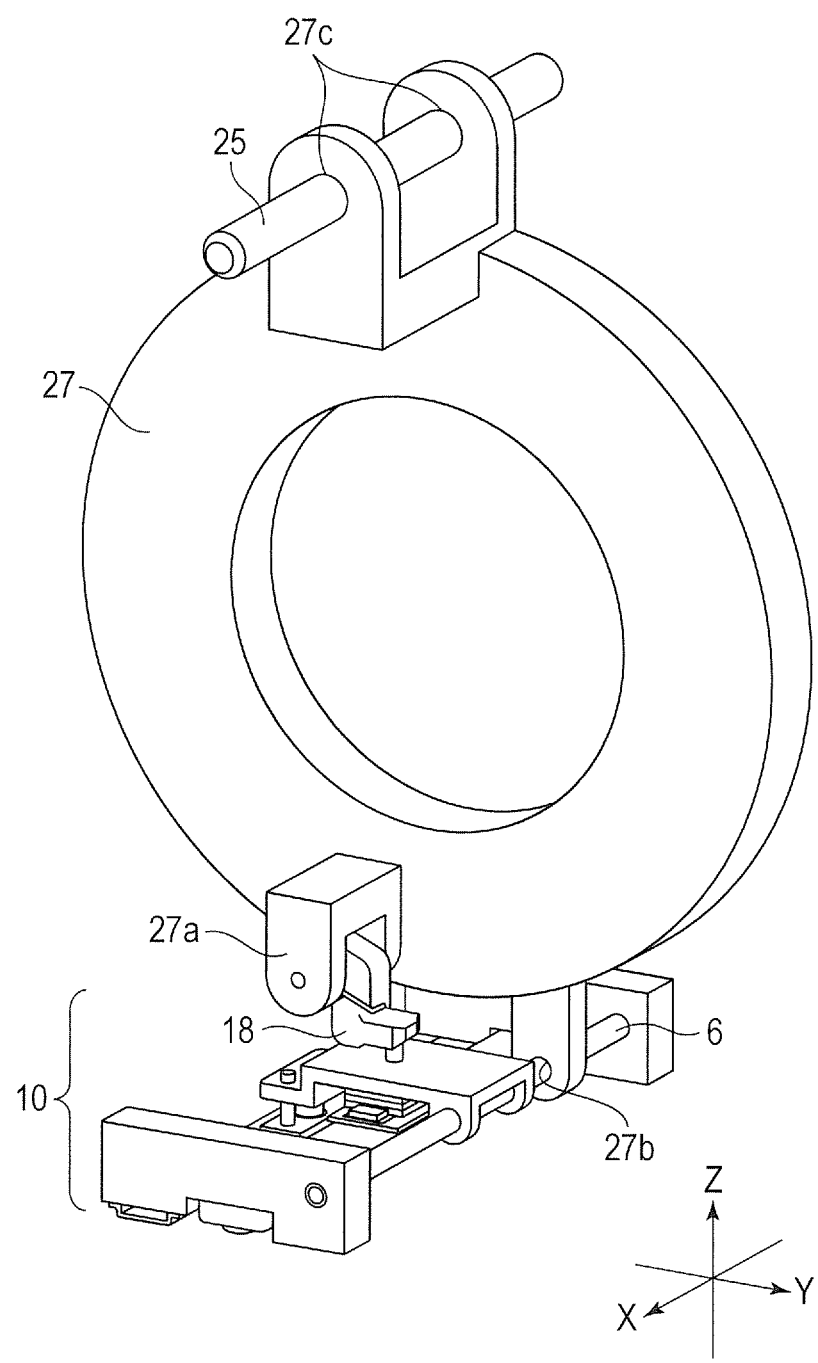
FIG. 10 is a view showing the third modification of the present invention.

FIG. 10 shows the third modification in which a linear driving apparatus constituted using the vibration wave motor 10 of one of Examples 1 to 4 described above is applied to an optical apparatus. A driving target body 27 is a holding member that is driven by a driving force output by the above-described vibration wave motor 10 and also holds an optical element used for a photographing apparatus or the like. The driving target body 27 includes a support portion 27a and guide holes 27b and 27c. The guide holes 27c on one side are guided along a guide shaft 25, and the guide hole 27b on the other side is guided along the first guide member 6 provided in the vibration wave motor 10. The transmission member 18 engages with the support portion 27a. According to this arrangement, the number of components can be reduced, and the apparatus can be simplified. In addition, since the driving target body 27 shares the first guide member 6 used by the vibration wave motor 10 as a guide member, it is possible to obtain the effect of improving the linear motion accuracy. In the third modification as well, other arrangements can be selected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-227408, filed Nov. 20, 2015, which is hereby incorporated by reference herein in its entirety.

What is claimed is:

1. A linear driving apparatus comprising:
a vibration wave motor including:
a vibrator having a piezoelectric element configured to generate a vibration;
a friction member configured to come into contact with a protruding portion provided on the vibrator;
a moving member movable in a predetermined moving direction with respect to the friction member;
a coupling member configured to couple the vibrator and the moving member with each other;
a first guide member configured to guide the moving member in the moving direction;
a press member configured to act on the moving member and capable of moving in the predetermined moving direction together with the moving member; and
a second guide member configured to guide the press member in the predetermined moving direction;
a driving target body movable in the predetermined moving direction;
a transmission member configured to engage with the driving target body, abut against an abutment part of the moving member, and transmit a driving force of the vibration wave motor to the driving target body; and
a biasing member configured to apply a biasing force between the transmission member and the abutment part,
wherein a direction of a frictional contact force that the vibrator receives from the friction member and a direction of a biasing contact force that the abutment part receives from the biasing member are parallel and opposite, and
a load center of a distribution load of the biasing contact force exists in a range of an outside shape of the vibrator.

2. An apparatus according to claim 1, wherein an auxiliary moving member is provided between the press member and the second guide member.

3. An apparatus according to claim 1, wherein on a plane perpendicular to the direction of the frictional contact force, a load center of a distribution load of the frictional contact force and the load center of the distribution load of the biasing contact force are aligned in a direction perpendicular to both the predetermined moving direction and the direction of the frictional contact force.

4. An apparatus according to claim 1, wherein on a plane perpendicular to the direction of the frictional contact force, a load center of a distribution load of the frictional contact force and the load center of the distribution load of the biasing contact force substantially coincide with each other.

5. An apparatus according to claim 1, wherein the first guide member guides the driving target body in the predetermined moving direction.

6. An apparatus according to claim 1, wherein the vibration is an ultrasonic vibration, and the vibration wave motor comprises an ultrasonic motor configured to generate the ultrasonic vibration.

7. An apparatus according to claim 1, wherein the driving target body comprises a holding member configured to hold an optical element.

8. A vibration wave motor comprising:
a vibrator having a piezoelectric element configured to generate a vibration;
a friction member configured to come into contact with a protruding portion provided on the vibrator;
a first moving member movable in a predetermined moving direction with respect to the friction member;
a coupling member configured to couple the vibrator and the first moving member with each other;
a first guide member configured to guide the first moving member in the predetermined moving direction;
a press member configured to act on the first moving member and capable of moving in the predetermined moving direction together with the first moving member; and
a second guide member configured to guide the press member in the predetermined moving direction.

9. A motor according to claim 8, wherein a second moving member is provided between the press member and the second guide member.

10. A motor according to claim 9, wherein the press member is provided between the first moving member and the second moving member.

11. A motor according to claim 9, wherein the second moving member engages with the first moving member and is guided in the predetermined moving direction by the second guide member.

12. A motor according to claim 8, wherein the second guide member comprises one of a rail-shaped plate member, a round bar member, a friction reducing sheet member, and a roller member.

13. A motor according to claim 8, wherein a size of the moving member in the predetermined moving direction is not greater than a size of the vibrator in the predetermined moving direction.

14. A motor according to claim 8, wherein the vibration is an ultrasonic vibration, and the vibration wave motor comprises an ultrasonic motor configured to generate the ultrasonic vibration.

15. A linear driving apparatus comprising:
a vibration wave motor of claim 8;
a driving target body movable in the predetermined moving direction;
a transmission member configured to engage with the driving target body, abut against an abutment part of the first moving member, and transmit a driving force of the vibration wave motor to the driving target body; and
a biasing member configured to apply a biasing force between the transmission member and the abutment part.

16. An apparatus according to claim 15, wherein the first guide member guides the driving target body in the predetermined moving direction.

17. An optical apparatus using a linear driving apparatus of claim 15, wherein the driving target body comprises a holding member configured to hold an optical element.

* * * * *